(12) United States Patent  
Chen

(10) Patent No.: US 10,025,129 B2  
(45) Date of Patent: Jul. 17, 2018

(54) ARRAY SUBSTRATES AND TOUCH PANELS

(71) Applicant: Wuhan China Star Optoelectronics Technology Co., Ltd., Wuhan, Hubei (CN)

(72) Inventor: Caiqin Chen, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 282 days.

(21) Appl. No.: 14/917,950

(22) PCT Filed: Feb. 22, 2016

(86) PCT No.: PCT/CN2016/074229  
§ 371 (c)(1),  
(2) Date: Mar. 10, 2016

(87) PCT Pub. No.: WO2017/128459  
PCT Pub. Date: Aug. 3, 2017

(65) Prior Publication Data  
US 2018/0052349 A1     Feb. 22, 2018

(30) Foreign Application Priority Data  
Jan. 25, 2016   (CN) .......................... 2016 1 0049384

(51) Int. Cl.  
G02F 1/1333   (2006.01)  
G02F 1/1335   (2006.01)  
(Continued)

(52) U.S. Cl.  
CPC ........ G02F 1/13338 (2013.01); G02F 1/1343 (2013.01); G02F 1/133345 (2013.01);  
(Continued)

(58) Field of Classification Search  
CPC ..... G02F 2001/134318; G02F 1/13338; G02F 1/133514; G02F 1/133512;  
(Continued)

(56) References Cited

U.S. PATENT DOCUMENTS 9,097,928 B2 *   8/2015   Zhou ..................... G06F 3/0412  
9,250,736 B2 *   2/2016   Wang .................... G06F 3/0416  
(Continued)

FOREIGN PATENT DOCUMENTS

CN   104714343 A   3/2015  
CN   104898332 A   6/2015  
CN   105093742 A   8/2015

*Primary Examiner* — Sanjiv D Patel  
(74) *Attorney, Agent, or Firm* — Andrew C. Cheng

(57) ABSTRACT

The present disclosure relates to an array substrate and a touch panel. The array substrate includes a pixel electrode layer, a first touch electrode layer and an insulation layer and a second touch electrode layer arranged on the first touch electrode layer in sequence. The pixel electrode layer is not overlapped with at least one of the first touch electrode layer and the second touch electrode layer, and the insulation layer is not provided within a vertical projection area of the pixel electrode layer. In this way, when the thickness of the insulation layer between the first touch electrode layer and the second touch electrode layer is increased to reduce the parasitic capacitance between the touch electrode layers, the dimension of the liquid crystal capacitor and the storage capacitor is prevented from being affected.

7 Claims, 3 Drawing Sheets

(51) Int. Cl.
*G06F 3/041* (2006.01)
*G06F 3/044* (2006.01)
*G02F 1/1343* (2006.01)

(52) U.S. Cl.
CPC ........ *G02F 1/133512* (2013.01); *G06F 3/044* (2013.01); *G06F 3/0412* (2013.01)

(58) Field of Classification Search
CPC .. G02F 1/133345; G06F 3/0412; G06F 3/044; G06F 2203/04103; G09G 2300/0426; G09G 2300/0439; G09G 2300/0465
See application file for complete search history.

(56) References Cited

U.S. PATENT DOCUMENTS

| | | | |
|---|---|---|---|
| 9,519,387 B2* | 12/2016 | Kim | G06F 3/044 |
| 2004/0150759 A1* | 8/2004 | Nishino | G02F 1/133555 349/38 |
| 2009/0284707 A1 | 11/2009 | Cho et al. | |
| 2012/0105337 A1* | 5/2012 | Jun | G06F 3/0412 345/173 |
| 2013/0147730 A1* | 6/2013 | Chien | G06F 3/0412 345/173 |
| 2014/0353672 A1 | 12/2014 | Choi et al. | |
| 2015/0331529 A1* | 11/2015 | Lee | G06F 3/044 345/174 |
| 2016/0349559 A1* | 12/2016 | Woo | G02F 1/13338 |
| 2017/0168614 A1* | 6/2017 | Wei | G06F 3/044 |
| 2017/0199409 A1 | 7/2017 | Hu et al. | |

* cited by examiner

ARRAY SUBSTRATES AND TOUCH PANELS

BACKGROUND OF THE INVENTION

1. Field of the Invention

The present disclosure relates to touch technology, and more particularly to an array substrate and a touch panel.

2. Discussion of the Related Art

With the electronic development, touch panels are widely adopted in human life. Touch panels are characterized by attributes such as durable, fast response time, space saving, and easy to exchange. Users only need to tap the icons on the touch panel to activate the desired functions, which facilitate human-computer interaction.

The touch panels include On-cell Touch Panels and In-cell Touch panels, wherein the in-cell touch panels relate to embedding the touch sensing functions into the metallurgy pixels. This may contribute to the thin and light design, and thus had received customers' favored.

FIG. 1 is a schematic view of the conventional liquid crystal panel. The liquid crystal panel includes a top substrate 11, a down substrate 12, and a liquid crystal layer 13 between the top substrate 11 and the down substrate 12. The down substrate 12 includes a source/drain metallic layer 121 having TFTs, an organic insulation layer 122, a common electrode layer 123, a passivation layer 124, and a pixel electrode layer 125.

FIG. 2 is a schematic view of the conventional in-cell touch panel. With respect to the conventional in-cell touch panel, a touch electrode layer 21 and an insulation layer 22 are arranged on the down substrate 12. The touch electrode layer 21 and the common electrode layer 123 operates as an sensing electrode providing the touch/sense functions of the touch panel, wherein the insulation layer 22 covers the common electrode layer 123. The touch electrode layer 21 is arranged on a portion of the insulation layer 22. The passivation layer 124 covers the touch electrode layer 21 and the insulation layer 22. The pixel electrode layer 125 is arranged on the passivation layer 124. As the parasitic capacitance may be generated between the touch electrode layer 21 and the common electrode layer 123, usually, a thicker insulation layer 22 may be formed to avoid the huge parasitic capacitance between the touch electrode layer 21 and the common electrode layer 123.

However, as shown in FIG. 2, the thickness of the insulation layer 22 may change the gap between the pixel electrode layer 125 and the top substrate 11 and the gap between the pixel electrode layer 125 and the common electrode layer 123. Thus, if the thickness of the insulation layer 22 is increased to reduce the parasitic capacitance of the touch electrode, the dimension of the liquid crystal capacitor and the storage capacitor may be affected, and so does the display performance.

SUMMARY

The present disclosure relates to an array substrate and a touch panel to decrease the parasitic capacitance between the touch electrodes without affecting the dimension of the liquid crystal capacitor and the storage capacitor.

In one aspect, an array substrate for touch panels includes: a pixel electrode layer, a first touch electrode layer and an insulation layer and a second touch electrode layer arranged on the first touch electrode layer in sequence; wherein the pixel electrode layer is not overlapped with at least one of the first touch electrode layer and the second touch electrode layer, and the insulation layer is not provided within a vertical projection area of the pixel electrode layer; and the first touch electrode layer is a common electrode layer, and the second touch electrode is configured within a vertical projection area of a black matrix.

Wherein the array substrate further includes a passivation layer; and the pixel electrode is not overlapped with the second touch electrode layer, the pixel electrode includes a plurality of pixel electrode bars, the insulation layer includes a plurality of insulation layers on the first touch electrode layer, and the insulation layer are spaced apart from each other, and the second touch electrode layer is arranged on one of insulation layers, the passivation layer arranged on the first touch electrode layer between the second touch electrode layer and the insulation layer, the pixel electrode bars are arranged on the passivation layer between the insulation layers, and the insulation layer is not configured within the vertical projection area of the pixel electrode bars.

Wherein the array substrate further includes a passivation layer; and the pixel electrode is not overlapped with the second touch electrode layer, the pixel electrode includes a plurality of pixel electrode bars, the insulation layer covers a portion of the first touch electrode layer, and the passivation layer is configured on the second touch electrode layer and the first touch electrode layer uncovered by the insulation layer, the pixel electrode bars are configured on the passivation layer, and the insulation layer is not configured between the vertical projection area of each of the pixel electrode bars and the pixel electrode bars.

In another aspect, an array substrate for touch panels includes: a pixel electrode layer, a first touch electrode layer and an insulation layer and a second touch electrode layer arranged on the first touch electrode layer in sequence; wherein the pixel electrode layer is not overlapped with at least one of the first touch electrode layer and the second touch electrode layer, and the insulation layer is not provided within a vertical projection area of the pixel electrode layer.

Wherein the array substrate further includes a passivation layer; and the pixel electrode is not overlapped with the second touch electrode layer, the pixel electrode includes a plurality of pixel electrode bars, the insulation layer includes a plurality of insulation layers on the first touch electrode layer, and the insulation layer are spaced apart from each other, and the second touch electrode layer is arranged on one of insulation layers, the passivation layer is arranged on the first touch electrode layer between the second touch electrode layer and the insulation layer, the pixel electrode bars are arranged on the passivation layer between the insulation layers, and the insulation layer is not configured within the vertical projection area of the pixel electrode bars.

Wherein the array substrate further includes a passivation layer; and the pixel electrode is not overlapped with the second touch electrode layer, the pixel electrode includes a plurality of pixel electrode bars, the insulation layer covers a portion of the first touch electrode layer, and the passivation layer is configured on the second touch electrode layer and the first touch electrode layer uncovered by the insulation layer, the pixel electrode bars are configured on the passivation layer, and the insulation layer is not configured between the vertical projection area of each of the pixel electrode bars and the pixel electrode bars.

Wherein the first touch electrode layer is a common electrode layer.

Wherein the second touch electrode is configured within a vertical projection area of a black matrix.

In another aspect, a touch panel includes: an array substrate, a color filter (CF) substrate, and a liquid crystal layer between the array substrate and the CF substrate, the array substrate includes a pixel electrode layer, a first touch electrode layer and an insulation layer and a second touch electrode layer arranged on the first touch electrode layer in sequence; and wherein the pixel electrode layer is not overlapped with at least one of the first touch electrode layer and the second touch electrode layer, and the insulation layer is not provided within a vertical projection area of the pixel electrode layer.

Wherein the array substrate further includes a passivation layer; and the pixel electrode is not overlapped with the second touch electrode layer, the pixel electrode includes a plurality of pixel electrode bars, the insulation layer includes a plurality of insulation layers on the first touch electrode layer, and the insulation layer are spaced apart from each other, and the second touch electrode layer is arranged on one of insulation layers, the passivation layer is arranged on the first touch electrode layer between the second touch electrode layer and the insulation layer, the pixel electrode bars are arranged on the passivation layer between the insulation layers, and the insulation layer is not configured within the vertical projection area of the pixel electrode bars.

Wherein the array substrate further includes a passivation layer; and the pixel electrode is not overlapped with the second touch electrode layer, the pixel electrode includes a plurality of pixel electrode bars, the insulation layer covers a portion of the first touch electrode layer, and the passivation layer is configured on the second touch electrode layer and the first touch electrode layer uncovered by the insulation layer, the pixel electrode bars are configured on the passivation layer, and the insulation layer is not configured between the vertical projection area of each of the pixel electrode bars and the pixel electrode bars.

Wherein the first touch electrode layer is a common electrode layer.

Wherein the CF substrate includes a black matrix, and the second touch electrode layer is configured to be within the vertical projection area of the black matrix.

In view of the above, the insulation layer is arranged between the first touch electrode layer and the second touch electrode layer. In addition, the vertical projection area of the pixel electrode layer does not include the insulation layer. That is, the insulation layer between the first touch electrode layer and the second touch electrode layer is not within the vertical projection area of the pixel electrode layer. As such, the thickness of the insulation layer between the first touch electrode layer and the second touch electrode layer may not affect the gap between the pixel electrode and the common electrode on another substrate. Also, the gap between the pixel electrode and the common electrode on the array substrate may not be affected. Thus, when the thickness of the insulation layer between the first touch electrode layer and the second touch electrode layer is increased to reduce the parasitic capacitance between the touch electrode layers, the dimension of the liquid crystal capacitor and the storage capacitor is prevented from being affected.

DETAILED DESCRIPTION OF THE EMBODIMENTS

Embodiments of the invention will now be described more fully hereinafter with reference to the accompanying drawings, in which embodiments of the invention are shown.

The array substrate and the liquid crystal panel that may be adopted in the present disclosure will be described hereinafter. The array substrate and the color filter (CF) substrate are bonded together, and the liquid crystals are provided between the array substrate and the CF substrate to obtain the liquid crystal panel. Wherein, the liquid crystal capacitor is the parallel-plate capacitor formed by the pixel electrode on the array substrate and the common electrode on the CF substrate, and the storage capacitor is the parallel-plate capacitor formed by the pixel electrode on the array substrate and the common electrode on the array substrate.

Figure 1:
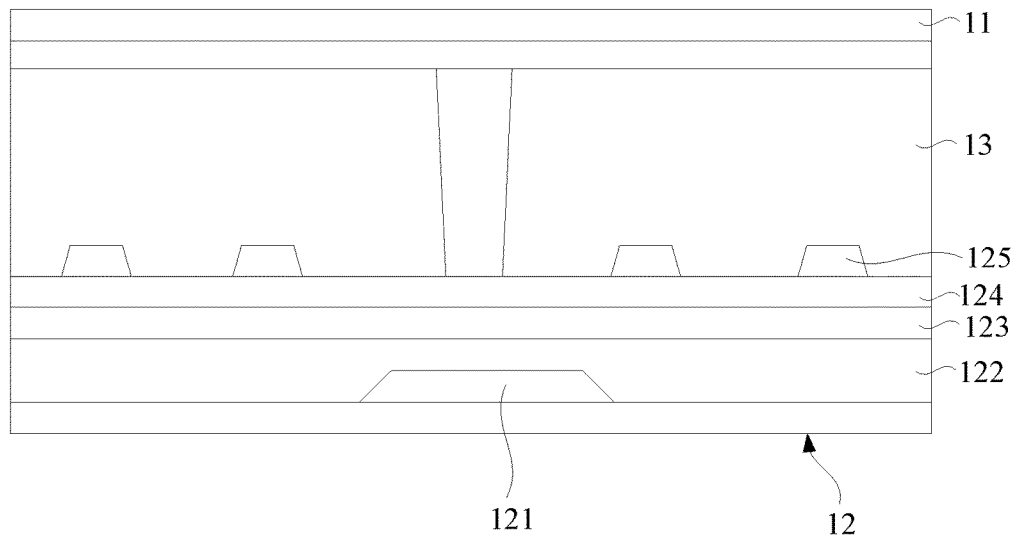
FIG. 1 is a schematic view of the conventional liquid crystal panel.
Figure 2:
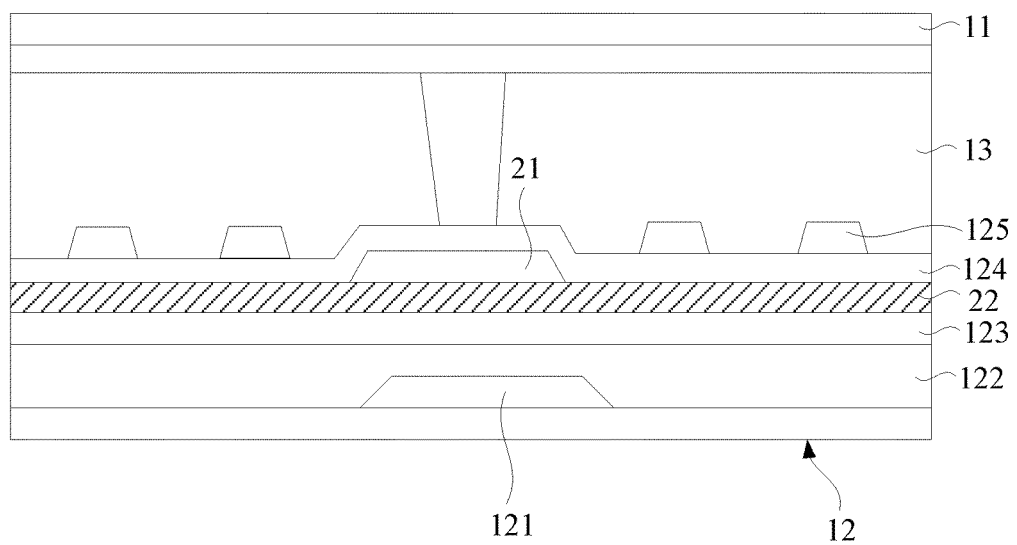
FIG. 2 is a schematic view of the conventional in-cell touch panel.
Figure 3:
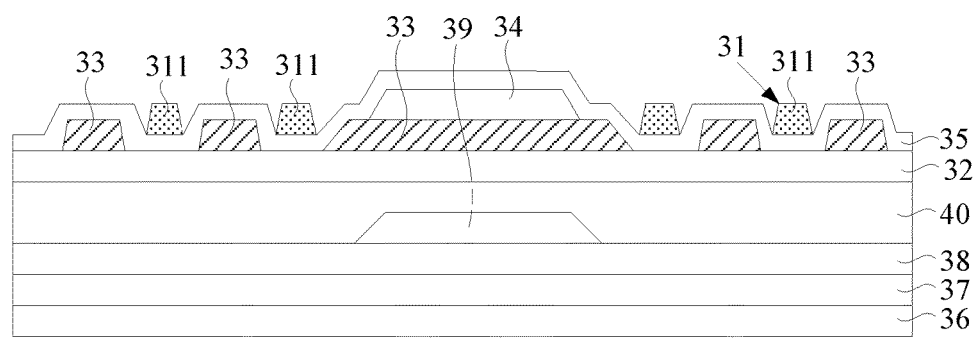
FIG. 3 is a schematic view of the array substrate of the touch panel in accordance with one embodiment.

FIG. 3 is a schematic view of the array substrate of the touch panel in accordance with one embodiment. The array substrate includes a pixel electrode layer 31, a first touch electrode layer 32, an insulation layer 33 stacked on the first touch electrode layer 32 in sequence, and a second touch electrode layer 34. That is, the insulation layer 33 is arranged between the first touch electrode layer 32 and the second touch electrode layer 34.

When performing the touch function, the first touch electrode layer 32 may be a driving electrode, and the second touch electrode layer 34 may be a sensing electrode. The first touch electrode layer 32 and the second touch electrode layer 34 cooperatively operate to accomplish the touch/sensing function.

The pixel electrode layer 31 and the second touch electrode layer 34 are not overlapped, and a vertical projection area of the pixel electrode layer 31 does not include the insulation layer 33. That is, the insulation layer 33 formed between the first touch electrode layer 32 and the second touch electrode layer 34 is not within the vertical projection area of the pixel electrode layer 31. Thus, when the array substrate is bonded with another CF substrate, the thickness of the insulation layer 33 between the first touch electrode layer 32 and the second touch electrode layer 34 may not affect the gap between the pixel electrode layer 31 and the common electrode layer of the CF substrate. Also, the gap between the pixel electrode layer 31 and the common electrode on the array substrate may not be affected. Thus, when the thickness of the insulation layer 33 between the first touch electrode layer 32 and the second touch electrode layer 34 is increased to reduce the parasitic capacitance between the touch electrode layers 32, 34, the dimension of the liquid crystal capacitor and the storage capacitor is prevented from being affected such that the display performance is guaranteed.

Further, in the embodiment, the array substrate further includes a passivation layer 35. The first touch electrode layer 32 is the common electrode layer of the array substrate. The pixel electrode layer 31 is not overlapped with the second touch electrode layer 34. The pixel electrode layer 31 is partially overlapped with the first touch electrode layer 32, and is above the first touch electrode layer 32. The insulation layer 33 includes a plurality of insulation layers 33 on the first touch electrode layer 32. The insulation layers 33 are spaced apart from each other. The second touch electrode layer 34 is arranged on one of the insulation layers 33, and the first touch electrode layer 32 between the insulation layers 33 does not include the insulation layer 33 thereon.

The passivation layer 35 is arranged on the second touch electrode layer 34, the first touch electrode layer 32 between the insulation layers 33, and the insulation layer 33 uncovered by the second touch electrode layer 34. The pixel electrode layer 31 includes a plurality of pixel electrode bars 311 respectively arranged on the passivation layer 35 between the insulation layers 33. That is, the pixel electrode bars 311 directly cover the passivation layer 35 on the first touch electrode layer 32. In addition, the pixel electrode bars 311 directly contacts with the passivation layer 35 such that the vertical projection area of the pixel electrode bars 311 does not include the insulation layer 33.

Thus, in the embodiment, the insulation layer 33 is arranged between the pixel electrode bars 311. In addition, the insulation layer 33 between the pixel electrode bars 311 also includes the passivation layer 35 thereon Wherein the array substrate further includes a base 36 and a gate insulation layer 37 on the base 36, an insulator layer (ILD) 38, a source/drain metallic layer 39, and an organic insulation layer 40. The pixel electrode layer 31 is arranged on the organic insulation layer 40.

In one embodiment, the array substrate may be made by the method including the following steps:

In step S41, providing a base 36.

In step S42, forming the gate insulation layer 37, the ILD layer 38, the source/drain metallic layer 39, and the organic insulation layer 40 in sequence.

In step S43, forming the first touch electrode layer 32 on the organic insulation layer 40.

In step S44, forming the insulation layer 33 on the first touch electrode layer 32, and the insulation layer 33 covers the first touch electrode layer 32.

In step S45, removing a portion of the insulation layer 33 to form the insulation layers 33 on the first touch electrode layer 32, and the insulation layers 33 are spaced part from each other. In addition, exposing the first touch electrode layer 32 between the insulation layers 33.

In step S46, forming the second touch electrode layer 34 on the insulation layer 33.

In step S47, forming the passivation layer 35 on the first touch electrode layer 32 between the second touch electrode layer 34 and the insulation layer 33 and on the insulation layer 33 uncovered by the second touch electrode layer 34.

In step S48, forming the pixel electrode bars 311 on the passivation layer 35 between the insulation layers 33.

Between steps S45 and S46 and after the insulation layer 33 is formed on the first touch electrode layer 32, alternatively, the second touch electrode layer 34 may be formed on the insulation layer 33. Afterward, the second touch electrode layer 34 operates as a self-alignment mask to remove the insulation layer 33 uncovered by the second touch electrode layer 34 so as to form the insulation layers 33 on the first touch electrode layer 32, and the insulation layers 33 are spaced apart from each other. In addition, the first touch electrode layer 32 between the insulation layers 33 are exposed.

In view of the above, the vertical projection area of the pixel electrode bars 311 do not include the insulation layer 33. As such, when the insulation layer 33 is configured with different thickness to reduce the parasitic capacitance between the first touch electrode layer 32 and the second touch electrode layer 34, the liquid crystal capacitor and the storage capacitor may be prevented from being affected by the insulation layer 33. In addition, by configuring the pixel electrode bars 311 between the insulation layer 33, the height of the insulation layer 33 may be a reference when forming the pixel electrode bars 311 to ensure the flatness of each of the pixel electrode bars 311. The flatness relates to the consistency of the height of each of the pixel electrode bars 311.

Figure 4:
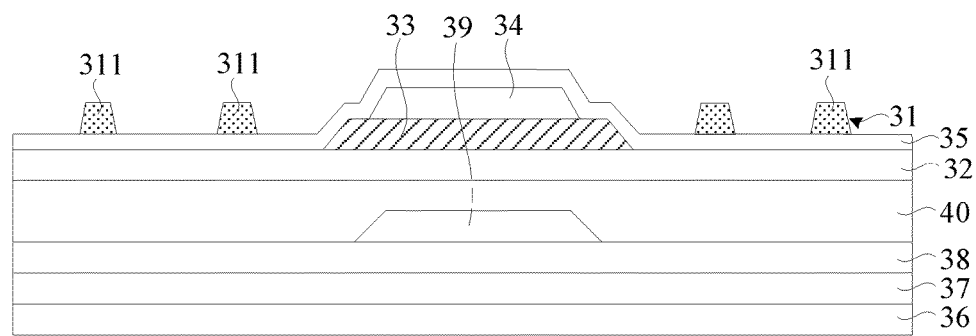
FIG. 4 is a schematic view of the array substrate of the touch panel in accordance with another embodiment.

FIG. 4 is a schematic view of the array substrate of the touch panel in accordance with another embodiment. The difference between FIGS. 4 and 3 resides in that, in this embodiment, the insulation layers 33 are only formed in the locations corresponding to the second touch electrode layer 34. That is, the insulation layers 33 are not formed in the rest of the locations, i.e., the insulation layers 33 are not formed between the pixel electrode bars 311

Thus, after the first touch electrode layer 32 is formed, the insulation layer 33 is formed on the first touch electrode layer 32, and the second touch electrode layer 34 is formed on the insulation layer 33. Afterward, the second touch electrode layer 34 operates as a self-alignment mask to remove the insulation layer 33 uncovered by the second touch electrode layer 34. The passivation layer 35 is formed on the second touch electrode layer 34 and the exposed first touch electrode layer 32. The pixel electrode bars 311 are formed on the passivation layer 35 directly contacting with the first touch electrode layer 32, wherein the pixel electrode bars 311 are not overlapped with the second touch electrode layer 34. As such, the vertical projection area of the pixel electrode bars 311 does not include the insulation layer 33, and the insulation layer 33 is only arranged between the first touch electrode layer 32 and the insulation layer 33.

Regarding the array substrate in the present disclosure, the manufacturing process may be simplified for the reason that the insulation layer 33 uncovered by the second touch electrode layer 34 is removed.

Wherein in the present disclosure, the second touch electrode layer 34 is arranged in a corresponding vertical projection area of the black matrix, that is, the second touch electrode layer 34 is arranged between the pixel cells. The black matrix is arranged on the CF substrate, and one pixel cell corresponds to one red photo-resist layer (R), green photo-resist layer (G), or one blue photo-resist layer (B) on the CF substrate.

In another embodiment, the first touch electrode layer 32 may be a touch electrode layer additionally configured on the array substrate to accomplish the touch and sensing function. At this moment, the pixel electrode layer 31 is not overlapped with the first touch electrode layer 32, 34.

Figure 5:
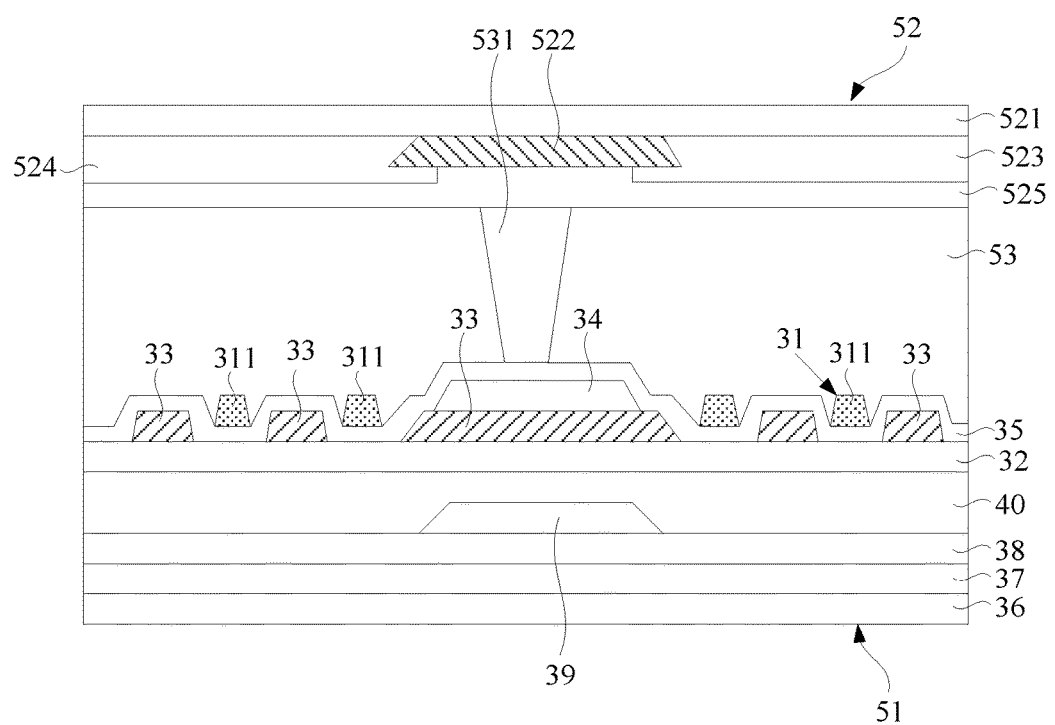
FIG. 5 is a schematic view of the touch panel in accordance with one embodiment.

FIG. 5 is a schematic view of the touch panel in accordance with one embodiment. The touch panel is a liquid crystal panel incorporated with the touch function. The touch panel includes an array substrate 51, a CF substrate 52, and a liquid crystal layer 53 between the array substrate and the liquid crystal layer 53.

The array substrate 51 may be the array substrate in any one of the above embodiment. Taking the array substrate in FIG. 3 as one example, the liquid crystal layer 53 includes a spacer 531 to ensure the gap of the liquid crystals. The array substrate 51 includes the pixel electrode layer 31, the first touch electrode layer 32, and the insulation layer 33 and the second touch electrode layer 34 arranged on the first touch electrode layer 32 in sequence. That is, the insulation layer 33 is arranged between the first touch electrode layer 32 and the second touch electrode layer 34.

The pixel electrode layer 31 and the second touch electrode layer 34 are not overlapped, and a vertical projection area of the pixel electrode layer 31 does not include the insulation layer 33. That is, the insulation layer 33 formed between the first touch electrode layer 32 and the second touch electrode layer 34 is not within the vertical projection area of the pixel electrode layer 31. Thus, when the array substrate 51 and the CF substrate 52 are bonded together, the thickness of the insulation layer 33 between the first touch electrode layer 32 and the second touch electrode layer 34 may not affect the gap between the pixel electrode layer 31 and the common electrode layer of the CF substrate. Also, the gap between the pixel electrode layer 31 and the common electrode on the array substrate may not be affected. Thus, when the thickness of the insulation layer 33 between the first touch electrode layer 32 and the second touch electrode layer 34 is increased to reduce the parasitic capacitance between the touch electrode layers 32, 34, the dimension of the liquid crystal capacitor and the storage capacitor is prevented from being affected such that the display performance is guaranteed.

Further, in the embodiment, the array substrate further includes a passivation layer 35. The first touch electrode layer 32 is the common electrode layer of the array substrate. The pixel electrode layer 31 is not overlapped with the second touch electrode layer 34. The pixel electrode layer 31 is partially overlapped with the first touch electrode layer 32, and is above the first touch electrode layer 32. The insulation layer 33 includes a plurality of insulation layers 33 on the first touch electrode layer 32. The insulation layers 33 are spaced apart from each other. The second touch electrode layer 34 is arranged on one of the insulation layers 33, and the first touch electrode layer 32 between the insulation layers 33 does not include the insulation layer 33 thereon.

The passivation layer 35 is arranged on the second touch electrode layer 34, the first touch electrode layer 32 between the insulation layers 33, and the insulation layer 33 uncovered by the second touch electrode layer 34. The pixel electrode layer 31 includes a plurality of pixel electrode bars 311 respectively arranged on the passivation layer 35 between the insulation layers 33. That is, the pixel electrode bars 311 directly cover the passivation layer 35 on the first touch electrode layer 32. In addition, the pixel electrode bars 311 directly contacts with the passivation layer 35 such that the vertical projection area of the pixel electrode bars 311 does not include the insulation layer 33.

Wherein the array substrate further includes a base 36 and a gate insulation layer 37 on the base 36, an insulator layer (ILD) 38, a source/drain metallic layer 39, and an organic insulation layer 40. The pixel electrode layer 31 is arranged on the organic insulation layer 40.

The CF substrate 52 includes a glass base 521, and a photo-resist layer on the glass base. The photo-resist layer includes a red photo-resist layer, a green photo-resist layer, and a blue photo-resist layer. Each of the photo-resist layers corresponds to one pixel cell on the array substrate 51, wherein only the red photo-resist layer 523 and the green photo-resist layer 524 are shown. The CF substrate 52 includes a black matrix 522 and a planar layer 525. The CF substrate 52 further includes a common electrode layer (not shown).

Wherein the spacer 531 is arranged within the liquid crystal layer 53 of the vertical projection area of the black matrix 522.

The second touch electrode layer 34 of the array substrate 51 is arranged within the vertical projection area of the black matrix 522.

In view of the above, the vertical projection area of the pixel electrode layer does not include the insulation layer 33 such that the insulation layer 33 may be arranged between the first touch electrode layer 32 and the second touch electrode layer 34, or the insulation layer 33 with different thickness may be configured so as to reduce the parasitic capacitance between the first touch electrode layer 32 and the second touch electrode layer 34. In this way, the dimension of the liquid crystal capacitor and the storage capacitor is prevented from being affected such that the display performance is guaranteed.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate for touch panels, comprising:
   a pixel electrode layer, a first touch electrode layer and an insulation layer and a second touch electrode layer arranged on the first touch electrode layer in sequence; wherein
   the first touch electrode layer is a common electrode layer, and the second touch electrode is configured within a vertical projection area of a black matrix;
   the array substrate further comprises a passivation layer; and
   the pixel electrode is not overlapped with the second touch electrode layer, the pixel electrode comprises a plurality of pixel electrode bars, the insulation layer comprises a plurality of insulation layers on the first touch electrode layer, and the insulation layer are spaced apart from each other, and the second touch electrode layer is arranged on one of insulation layers, the passivation layer is arranged on the first touch electrode layer between the second touch electrode layer and the insulation layer, the pixel electrode bars are arranged on the passivation layer between the insulation layers, and the insulation layer is not configured within the vertical projection area of the pixel electrode bars.

2. An array substrate for touch panels, comprising:
   a pixel electrode layer, a first touch electrode layer and an insulation layer and a second touch electrode layer arranged on the first touch electrode layer in sequence; wherein
   the pixel electrode is not overlapped with the second touch electrode layer, the pixel electrode comprises a plurality of pixel electrode bars, the insulation layer comprises a plurality of insulation layers on the first touch electrode layer, and the insulation layer are spaced apart from each other, and the second touch electrode layer is arranged on one of insulation layers, the passivation layer is arranged on the first touch electrode layer between the second touch electrode layer and the insulation layer, the pixel electrode bars are arranged on the passivation layer between the insulation layers, and the insulation layer is not configured within the vertical projection area of the pixel electrode bars.

3. The array substrate as claimed in claim 2, wherein the first touch electrode layer is a common electrode layer.

4. The array substrate as claimed in claim 2, wherein the second touch electrode is configured within a vertical projection area of a black matrix.

5. A touch panel, comprising:
an array substrate, a color filter (CF) substrate, and a liquid crystal layer between the array substrate and the CF substrate, the array substrate comprises a pixel electrode layer, a first touch electrode layer and an insulation layer and a second touch electrode layer arranged on the first touch electrode layer in sequence;
wherein
the array substrate further comprises a passivation layer; the pixel electrode is not overlapped with the second touch electrode layer, the pixel electrode comprises a plurality of pixel electrode bars, the insulation layer comprises a plurality of insulation layers on the first touch electrode layer, and the insulation layer are spaced apart from each other, and the second touch electrode layer is arranged on one of insulation layers, the passivation layer is arranged on the first touch electrode layer between the second touch electrode layer and the insulation layer, the pixel electrode bars are arranged on the passivation layer between the insulation layers, and the insulation layer is not configured within the vertical projection area of the pixel electrode bars.

6. The touch panel as claimed in claim 5, wherein the first touch electrode layer is a common electrode layer.

7. The touch panel as claimed in claim 5, wherein the CF substrate comprises a black matrix, and the second touch electrode layer is configured to be within the vertical projection area of the black matrix.

* * * * *